(12) United States Patent
Flaming et al.

(10) Patent No.: US 8,978,028 B2
(45) Date of Patent: Mar. 10, 2015

(54) TRANSACTIONAL MULTI-PACKAGE INSTALLATION

(75) Inventors: Robert Charles Flaming, Redmond, WA (US); Hemchander V. Sannidhanam, Bothell, WA (US); Venkata Kiran Kumar Annamraju, Snoqualmie, WA (US); William L. Cheng, Redmond, WA (US); Kin Yip Kenneth Wong, Redmond, WA (US); Carolyn L. Napier, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1659 days.

(21) Appl. No.: 11/973,741

(22) Filed: Oct. 10, 2007

(65) Prior Publication Data

US 2009/0100421 A1    Apr. 16, 2009

(51) Int. Cl.
*G06F 9/45* (2006.01)
*G06F 9/445* (2006.01)
*G06F 9/44* (2006.01)

(52) U.S. Cl.
CPC ........................................ *G06F 8/68* (2013.01)
USPC ............................ 717/174; 717/143; 717/177

(58) Field of Classification Search
CPC ............... G06F 8/61; G06F 8/60; G06F 8/62; G06F 8/41
See application file for complete search history.

(56) References Cited

U.S. PATENT DOCUMENTS

| | | | |
|---|---|---|---|
| 6,131,192 A | 10/2000 | Henry | |
| 6,161,218 A | 12/2000 | Taylor | |
| 6,438,749 B1 | 8/2002 | Chamberlain | |
| 6,959,401 B2 | 10/2005 | Lomet et al. | |
| 6,973,647 B2 * | 12/2005 | Crudele et al. | 717/177 |
| 7,017,155 B2 | 3/2006 | Peev et al. | |
| 7,047,529 B2 | 5/2006 | Delo | |
| 7,073,172 B2 | 7/2006 | Chamberlain | |
| 7,210,143 B2 * | 4/2007 | Or et al. | 717/174 |
| 7,310,801 B2 * | 12/2007 | Burkhardt et al. | 717/169 |
| 7,823,139 B2 * | 10/2010 | Zatloukal | 717/143 |

(Continued)

OTHER PUBLICATIONS

Anna-Brith Arntsen; The xTrans Transaction Model and FlexCP Commit Protocol; 2006; retrieved online on Oct. 8, 2014; pp. 1-36; Retrieved from the Internet: <URL: http://munin.uit.no/bitstream/handle/10037/393/report.pdf?sequence=1>.*

(Continued)

*Primary Examiner* — Thuy Dao
*Assistant Examiner* — Hanh T Bui
(74) *Attorney, Agent, or Firm* — Kate Drakos; Micky Minhas

(57) ABSTRACT

Described is installing multiple software packages to a computing device in a single transaction, whereby the multiple package installation commits if successful, or the device is rolled back to a determined state if unsuccessful. A client process provides a system service (installer) with a package, and the service partitions package installation actions into execution, commit and rollback phases, with the execution phase run for each package. If successful, the transaction is committed by performing the multiple commit phases. If unsuccessful, the installation is rolled back via the rollback phases. The phases may be interleaved, with execution and commit phases performed in FIFO order, and rollback phases performed in LIFO order. A client process may dynamically determine which packages to install, a client process may be embedded in a package and join the transaction, and/or one client process may delegate control to another client to add package actions to the transaction.

19 Claims, 12 Drawing Sheets

(56) References Cited

U.S. PATENT DOCUMENTS

| | | | |
|---|---|---|---|
| 2003/0121033 A1* | 6/2003 | Peev et al. | 717/175 |
| 2004/0255291 A1* | 12/2004 | Sierer et al. | 717/174 |
| 2005/0076333 A1* | 4/2005 | Leclair et al. | 717/176 |
| 2006/0048134 A1* | 3/2006 | Napier et al. | 717/169 |
| 2006/0112387 A1* | 5/2006 | Butt et al. | 717/177 |
| 2006/0259904 A1* | 11/2006 | Celli et al. | 717/174 |
| 2007/0130073 A1* | 6/2007 | Celli et al. | 705/51 |
| 2008/0092134 A1* | 4/2008 | Zhang et al. | 717/174 |
| 2008/0127170 A1* | 5/2008 | Goldman et al. | 717/174 |
| 2008/0127175 A1* | 5/2008 | Naranjo et al. | 717/174 |
| 2008/0155526 A1* | 6/2008 | Gokhale | 717/169 |
| 2012/0297378 A1* | 11/2012 | Shapiro | 717/177 |

OTHER PUBLICATIONS

Alexander Thomasian; Distributed Optimistic Concurrency Control Methods for High-Performance Transaction Processing; IEEE 1998; retrieved online on Oct. 8, 2014; pp. 173-189; Retrieved from the Internet: <URL: http://ieeexplore.ieee.org/stamp/stamp.jsp?tp=&arnumber=667102>.*

Benjamin Wester et al; Operating System Support for Application-Specific Speculation; ACM 2011; retrieved online on Oct. 8, 2014; pp. 229-242; Retrieved from the Internet: <URL: http://delivery.acm.org/10.1145/1970000/1966467/p229-wester.pdf?>.*

"Installation Phases and In-Script Execution Options for Custom Actions in Windows Installer", Published: Aug. 2001. Available at: http://www.installsite.org/pages/en/isnews/200108/index.htm.

"Tivoli Software", Retrieved on: Oct. 11, 2007, Available at: http://publib.boulder.ibm.com/tividd/td/ITCM/SC23-4712-01/en_US/HTML/cmmst82.htm#cmop514966.

* cited by examiner

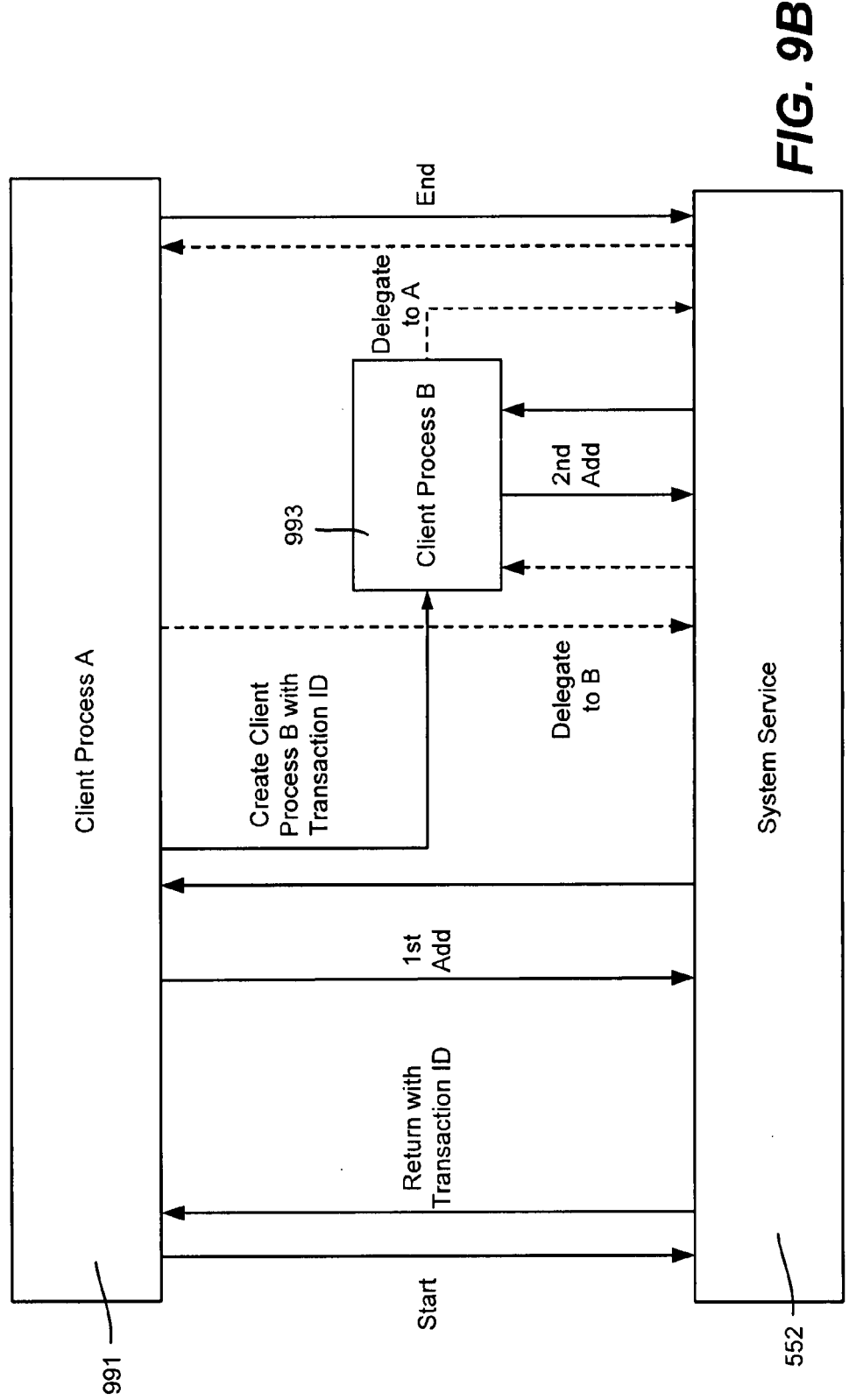

TRANSACTIONAL MULTI-PACKAGE INSTALLATION

BACKGROUND

Software products were once considered to be best distributed via a single, monolithic package. This single package concept, when combined with transactional installation techniques, provided a robust installation mechanism that eliminated many issues that otherwise arose whenever a software installation failed at some random point during the installation process.

Today, however, software product vendors often want their products to be decomposed and recomposed as late as possible, whereby the single package solution is not as desirable. By way of example, in the effort to enter more international markets, software providers want to separate out their language resources into localized binaries that are independently distributed with respect to their corresponding worldwide software package.

As another example, technology providers have been increasing the size and scope of the redistributable runtimes upon which software developers depend. While there used to be relatively small redistributables like Visual C runtimes, Visual Basic runtimes and the like, the size of redistributions has grown to include technologies such as DirectX®, Microsoft® Foundation Classes (MFC) and Microsoft® Data Access (MDAC). It was thus common for an application to be much larger than the framework on which it was based; today, however, applications are often far smaller than the size of the redistributables packages, e.g., relative to the size of the .Net Framework (dotnetfx), Windows® Framework, and/or Windows® Presentation Foundation.

Still further, businesses want to reduce the cost and turn-around time of software package distribution to rapidly reach new target markets and to adjust their products for existing target markets. This has resulted in software makers dividing previously monolithic packages into smaller and smaller packages (sometimes referred to as a mini-package or micro-package).

Other reasons for dividing products also exist. For example, products may be divided based upon CPU architecture and servicing purposes.

In sum, monolithic software package distribution is no longer desirable or acceptable in many circumstances. However, decomposing a monolithic package into smaller packages results in losing the installation robustness that single package technology provided. For example, with multiple package installation, an installation failure tends to cause the subject machine to be in an indeterminate state, which corresponds to a very high recovery cost for administrators and/or package vendor support personnel.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which multiple packages (which includes any updates/patches) are installed to a computing device in a single transaction, whereby installation of the multiple packages completes if successful, or the computing device is rolled back to a determined state. In one aspect, installation actions for multiple packages are partitioned into an execution phase, a commit phase, and a rollback phase for each package. The installation is controlled (e.g., by a client process) to perform the execution phase for each package. If the execution phase for each package is successful, the transaction is committed by performing the commit phase for each package. If the installation is unsuccessful, the installation is rolled back by performing the rollback phase up to a desired rollback point in the transaction. The rollback may be for all packages such that the computing device returns to a state prior to any execution phase.

In one example, the execution phases of the plurality of packages are interleaved so as to be performed in a first-in, first-out order, and the commit phases similarly interleaved. The rollback phases are interleaved so as to be performed in a last-in, first-out order.

In various aspects, a client process may dynamically determine which packages to install, e.g., based on circumstances during the install. A client process may be embedded in a package, and join the transaction. A first client process that may add zero or more packages to the transaction may create a second client process, and delegate control to the second client process for adding zero or more other packages to the multi-package transaction for installation.

In one example implementation, a system service having an interface set is configured to install software packages on a computing device. A client process coupled to the system service via the interface set controls the installation by providing packages to the system service in a multi-package transaction. The system service partitions installation actions for each provided package into an execution phase, commit phase and rollback phase, and runs the execution phase. The client process communicates with the system service to commit the transaction by performing the commit phases to complete installation, or to roll back the computing device to a state prior to installation by running one or more rollback phases.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 9B is a block diagram representing a delegable dynamic interleaved multi-package transaction in which one client process delegates control to another client process via a delegate function.

DETAILED DESCRIPTION

Various aspects of the technology described herein are generally directed towards transactional multi-package installation that allows package vendors to decompose software into smaller packages while retaining the robustness of single package installation. Note that as used herein and as generally understood, the term "installation" includes any or all of various installation-related actions, including a new install or reinstall, uninstall, repair (patch), and maintenance mode (adjust feature mix) operations. In one example implementation, this is accomplished via various aspects, including through the use of a dynamic, multi-package interleaved transaction, such as by performing an execution phase (early execute) of each package before committing or rolling back (late commit or rollback).

However, as will be understood, these are only example aspects. For example, a package vendor may choose to make installation of one package dependent on installation of another package, in which event the installation of a first package may need to occur before the installation of a second package that depends on the first. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and resource storage in general.

In general terms, a controlling client (alternatively referred to herein as a chainer) works in conjunction with an installer (e.g., part of a system service or the like) to stitch a set of smaller packages into a product. As a chainer progresses in time, the chainer operates by calling to the installer service to perform a series of package installations. For example, consider a two package installation, in which a first call from the chainer results in an installation that installs a word processing package to the target machine, while a second call from the chainer installs a spreadsheet package. If a failure occurs in the spreadsheet package installation, the installer service initiates a transaction rollback. However, after the spreadsheet package rollback completes, control returns to the chainer, which can only call an "uninstall" function for the word processing package. Because an uninstall is limited to performing much less work than a rollback, the machine is likely to be left in an indeterminate ("much dirtier") state relative to an installation in which the word processing and spreadsheet software were installed in a single package.

Figure 1:
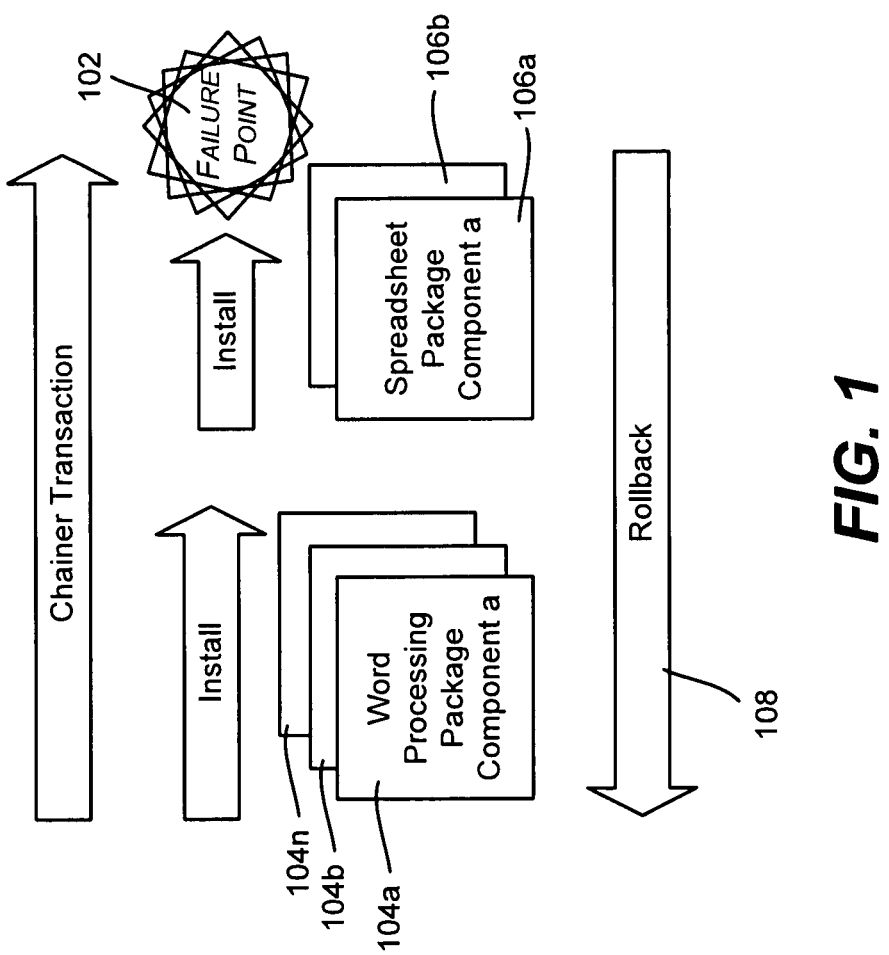
FIG. 1 is a representation of a multi-package installation that fails and transactionally rolls back to a previously existing machine state.

In contrast to the above example, consider the diagram of FIG. 1, in which the various interactions are the same as the above-described technique up to and including a failure point 102. Note that like the above failure scenario, the failure point 102 occurs after installation of the word processing package (components 104a-104n), and during the spreadsheet package installation (components 106a-106b). For example, the spreadsheet component 106b may be the reason that its respective package installation fails.

However, as represented in FIG. 1 and as described below, the chainer transactional rollback extends to the entire set of packages in the multi-package transactional installation. The multi-package rollback is represented as the arrow 108, and as can be seen, the rollback spans across both the word processing package (components 104a-104n) installation, and the spreadsheet package installation (components 106a-106b). In other words, instead of a rollback of the spreadsheet package's (partial) installation followed by an uninstall operation of the word processing package, a complete rollback occurs for both the spreadsheet package installation and the word processing package installation (and any intermediate installations, not shown). The machine is thus left in the state it was in prior to any installation steps.

Figure 2:
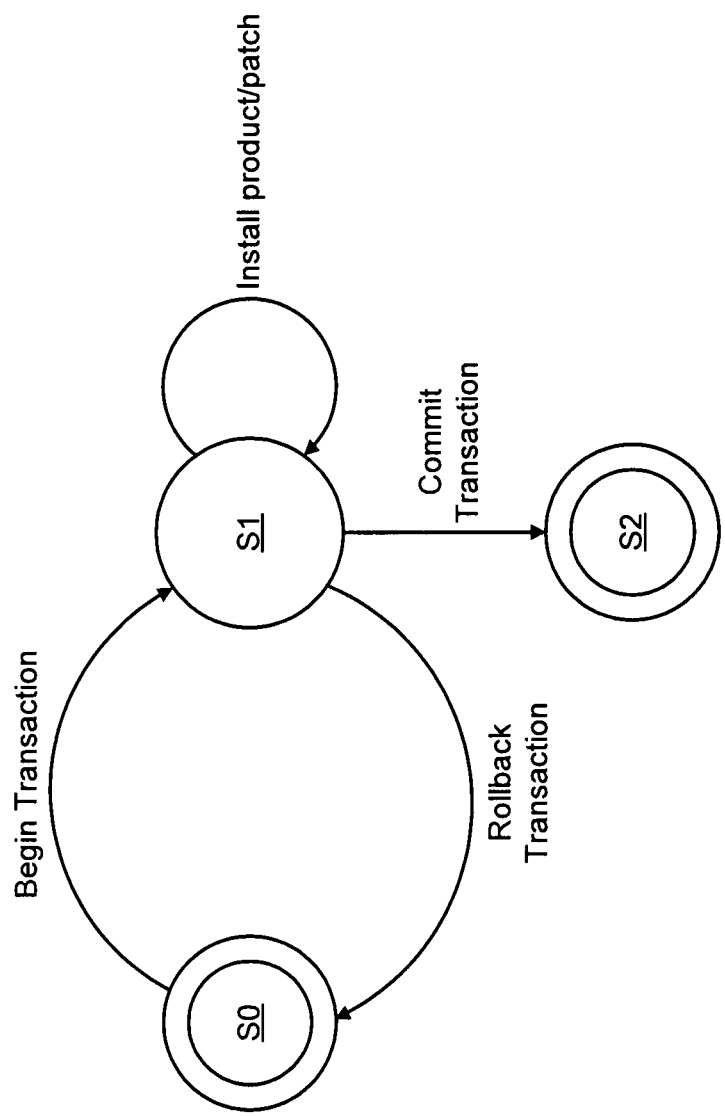
FIG. 2 is a state diagram representing a multi-package installation that either commits to a fully installed state or rolls back to a previously existing machine state.

FIG. 2 represents this general concept in a state diagram, in which either a failure occurs, resulting in a rollback transaction of the machine to state S0, or a transaction commit occurs, resulting in the complete installation, whereby the machine achieves state S2. The machine will not be left in some intermediate state S1, (which is likely to happen if an uninstall operation rather than a complete rollback occurs).

To accomplish a multi-package transaction, in one example aspect, various phases of the installation are partitioned as with an existing single package transaction. Note that the single package transaction comprises an execution phase which includes the forward work that is reversible, followed by either a commit phase that includes the forward work that is not reversible, or a rollback phase that includes the reverse actions that complement the forward work done in the execution phase.

In general, and as described below, one or more chainers add installation-related actions to a transaction, which as described above include any operations of a set that includes install, uninstall, repair (patch), and maintenance mode (adjust feature mix) operations. By way of example, one installation-related action added to a transaction may be an uninstall operation, whereby the completion of the commit phase of the uninstall operation removes the package or packages from the machine, while the rollback phase of the uninstall operation restores the package or packages to the machine.

Figure 3:
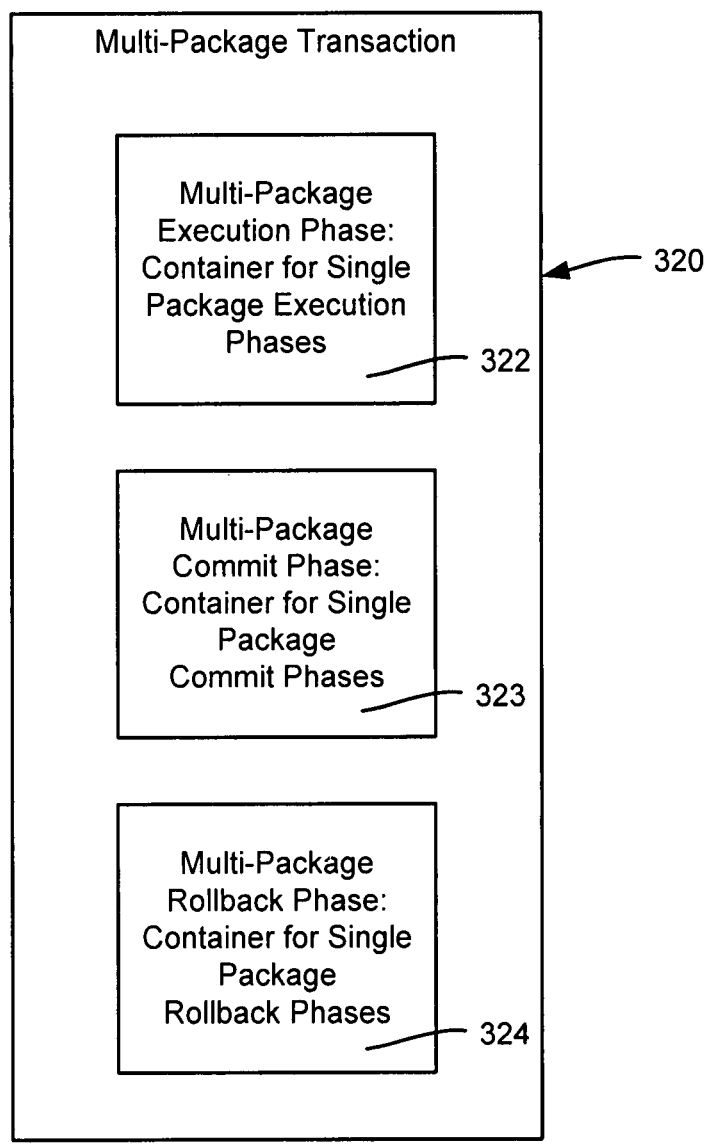
FIG. 3 is a block diagram representing containers corresponding to phases used within a multi-package installation to provide full commit or full rollback as part of a multi-package installation.

To accomplish a multi-package transaction, a similar execution and commit or rollback phase-partitioning concept is used, however when initiated, the multi-package transaction has no contents. Instead, the multi-package transaction has containers for aggregating zero or more phases from single package transactions. FIG. 3 comprises a block diagram that represents the partition of a multi-package transaction into its constituent phases that form single package phase containers.

More particularly, in the example of FIG. 3 the outer block represents the multi-package transaction 320. The three inner blocks 322-324 represent the three phases of the multi-package transaction. In general, scripts comprising a set of installation actions (op-codes) may be used in each of the phases, with the installer processing the scripts of different transactions in a particular order, as described below. In general, execution actions are forward in their natures, with complementary rollback actions being backward in their nature.

In FIG. 3, the block 322 corresponds to the container for the execution phase of the multi-package transaction, which can contain zero or more single package execution phases. The block 323 corresponds to the commit phase container of the multi-package transaction, which can contain zero or more single package commit phases. The block 324 corresponds to the rollback phase container of the multi-package transaction, and can contain zero or more single package rollback phases.

Figure 4:
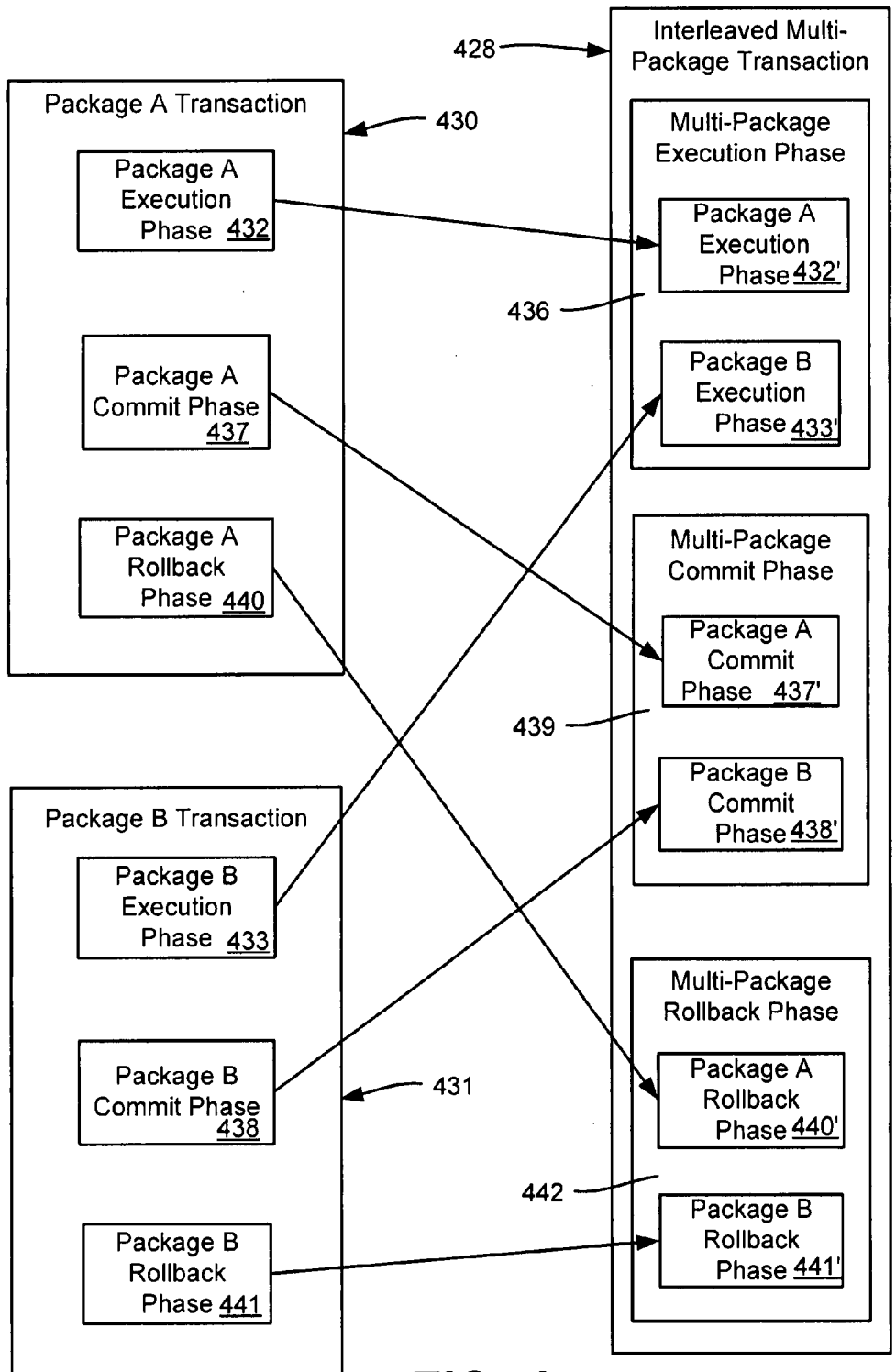
FIG. 4 is a block diagram representing the use of containers to interleave phases used within a multi-package installation to provide full commit or full rollback as part of a multi-package installation.

In one example implementation as represented in FIG. 4, the execution and commit or rollback phases are interleaved into an interleaved multi-package transaction 428 with corresponding multi-package transaction phase containers. In this example, for a two package transaction, package A transaction 430 and package B transaction 431, the package A execution phase 432 and package B execution phase 433 are grouped together into a multi-package execution phase container 436 (where the labels for the respective phases have a prime "'" appended thereto in the interleaved multi-package transaction 428). Similarly, the commit phase containers 437 and 438 are grouped together, as represented by their inclusion in the multi-package commit phase container 439, and the rollback phase containers 440 and 441 are grouped together in the multi-package rollback container 442. An alternative with respect to interleaving is to interleave at least some of the actions from each package into an interleaved set of actions. For example, rather than treat the phases 432' and 433' as separate execution entities in a queued fashion, actions from the phases 432' and 433' may be interleaved into a single merged entity.

Returning to the example, the directional lines of FIG. 4 show how the single package phases from single package transactions are interleaved into the multi-package transaction phases. The blocks 430 and 431 are similar to the block 320 in FIG. 3. Progressing top down, both transaction 430 and 431 perform their respective execution phases prior to either both committing in the commit phase or both rolling back in the rollback phase.

Although a two package interleaved installation example was shown in FIG. 4, it can be readily appreciated that more than two packages may be installed in this manner. For example, if four packages 1-4 are to be installed, in which "E" represents the execution phase, "C" the commit phase and "R" the rollback phase, the script processing order may be represented as 1E, 2E, 3E, 4E. If all execution phases succeed, the commit scripts are processed first-in, first-out, that is, as 1C, 2C, 3C, 4C in this example. If any execution phase failed, nothing is committed, and instead the rollback script is processed for the failed package as well as any previous packages, in reverse (last-in, first-out) order, e.g., if package 4 failed, the rollback script processing order would be 4R, 3R, 2R, 1R.

As will be understood, the aspects described herein are dynamic in that there is no requirement to have a static definition of the multi-package transaction, (although a static definition is feasible). Instead, the controlling client, (the chainer in this example), is able to dynamically add actions for individual packages depending on the circumstances that the chainer controls. For example, different installations may have different language dictionaries that are added or removed from an installation. There are two types of chainers, namely external (chainer 550 of FIG. 5) and embedded (chainer 650 FIG. 6).

Figure 5:
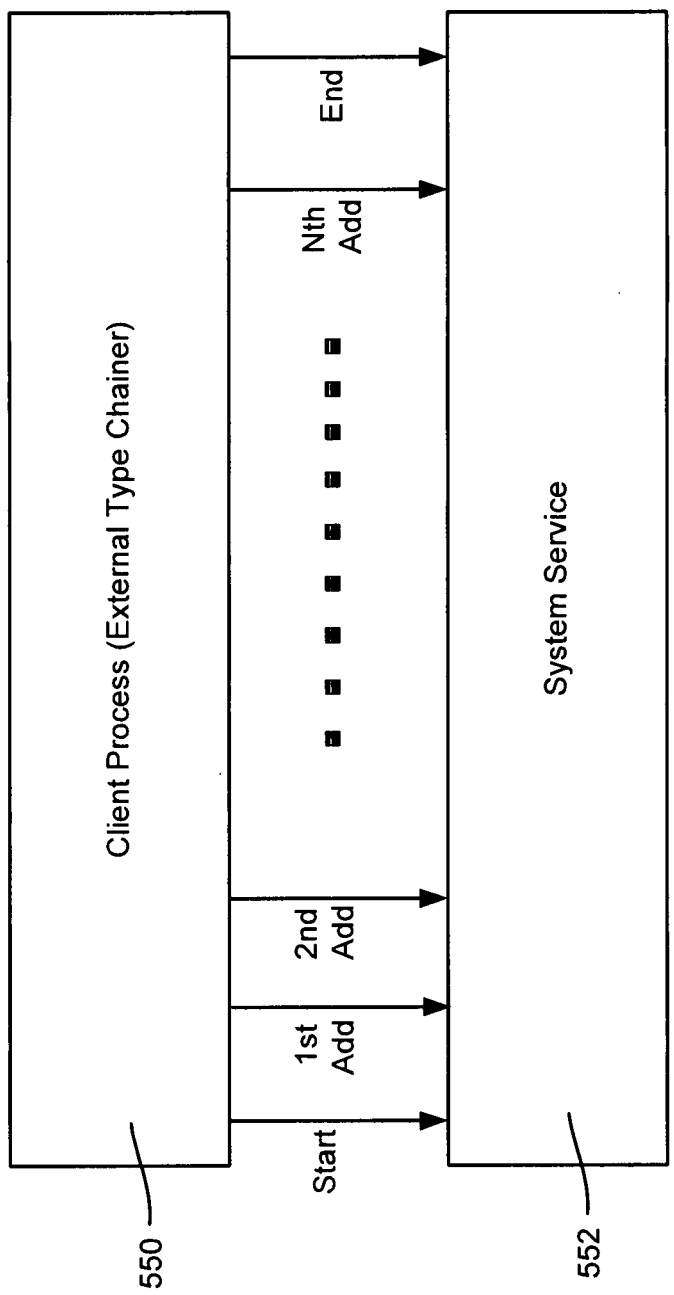
FIG. 5 is a block diagram representing dynamic interleaved multi-package transactions for external type of multi-package installation.

To support dynamic aspects with the external type chainer 550 (e.g., named setup.exe), the system service 552 provides a set behaviors that allow the external chainer 550 to start the multi-package transaction, add installation-related actions of packages and end the multi-package transaction. In FIG. 5, the external chainer 550 is the client process that controls the multi-package transaction. The other block represents the system service 552 that provides the multi-package transaction facilities, e.g., (implemented in the Microsoft® Windows® Installer service). The directional arrows between the client chainer 550 and the system service 552 represent the behaviors the client process chainer 550 uses from the system service 552. For example, the arrow on the far left represents the start behavior that initiates the multi-package transaction (and is thus labeled "Start"). The arrow on the far right is the "End" behavior that terminates the multi-package transaction. The arrows between the "Start" and "End" represent the "Add" behavior that adds installation-related actions of packages (which includes any updates/patches) to the multi-package transaction.

The other type of chainer, namely an embedded type chainer, is generally one that is embedded within a package and invoked by another chainer. By way of example of where an embedded chainer may be used, consider that when a program is run, a resiliency check may be performed to ensure that certain (key) files are not corrupted; if so, the files are repaired. However, at present a resiliency check is performed on a single package, and cannot span multiple packages, such as a word processing program in one package, with various dictionaries for support of multiple languages in one or more other packages. The embedded feature wraps multiple scripts into a single experience, so that one package (e.g., comprising a core engine) can specify dependencies on other packages, whereby if a resiliency check indicates a repair is needed, after the chainer and installer repairs a package, it knows to repair dependent packages.

Figure 6:
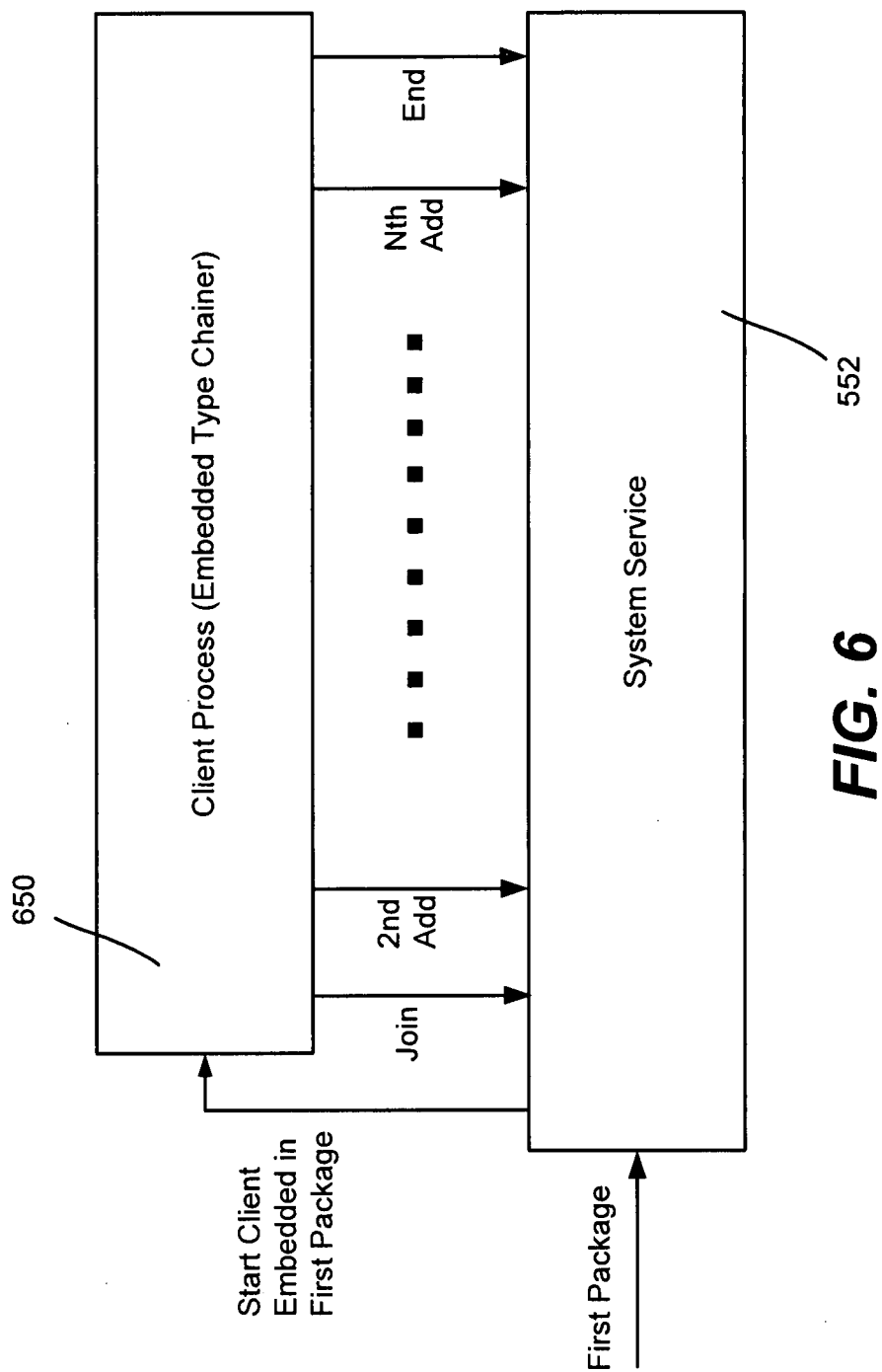
FIG. 6 is a block diagram representing dynamic interleaved multi-package transactions for an embedded type of multi-package installation.

FIG. 6 represents the supporting of such dynamic aspects with an embedded type chainer, with the arrows similarly representing behaviors that allow another (e.g., external) chainer to start a chainer 650 embedded inside a first package. The embedded chainer 650 may join an existing multi-package transaction, add installation-related actions of packages, and end the multi-package transaction. As can be seen, the arrow in the lower left corner of FIG. 6 demonstrates the way the embedded type chainer 650 is initiated, through the invocation of a first package that has the embedded chainer 650. The arrow on the far left is the start behavior (accompanied by the text "Start Client Embedded in First Package") that initiates a client process embedded chainer 650 in the package. The arrow accompanied by the text "Join" is a behavior that enables joining the client process to the already running transaction. The arrow on the far right is the "End" behavior that terminates the multi-package transaction. Further, "Add" behaviors are shown in FIG. 6 that add installation-related actions of packages to the multi-package transaction.

Note that a "Delegate" behavior, described below with reference to FIG. 9B, may be alternatively (or additionally) provided to change control to another process. In general, "Delegate" allows one client process (e.g., a parent) to call another client process (e.g., a child) to delegate control to that other client process.

Turning to the aspects related to early execute, late commit/rollback, these aspects provide the mechanism by which multi-package transaction phases are staged to create the multi-package transaction behavior. Under early execute, each single package execute phase is executed on the single package add. As the single package execute phase completes, control is returned to the client process (chainer) so that further packages may be added. Under late commit/rollback when the chainer terminates the multi-package transaction, the chainer determines whether the multi-package transaction should be committed or rolled back. If the call to end the transaction requests commit, the single package commit phases are processed in first-in-first-out order. If the call to end the transaction requested rollback, the single package rollback phases are processed in last-in-first-out order.

Figure 7:
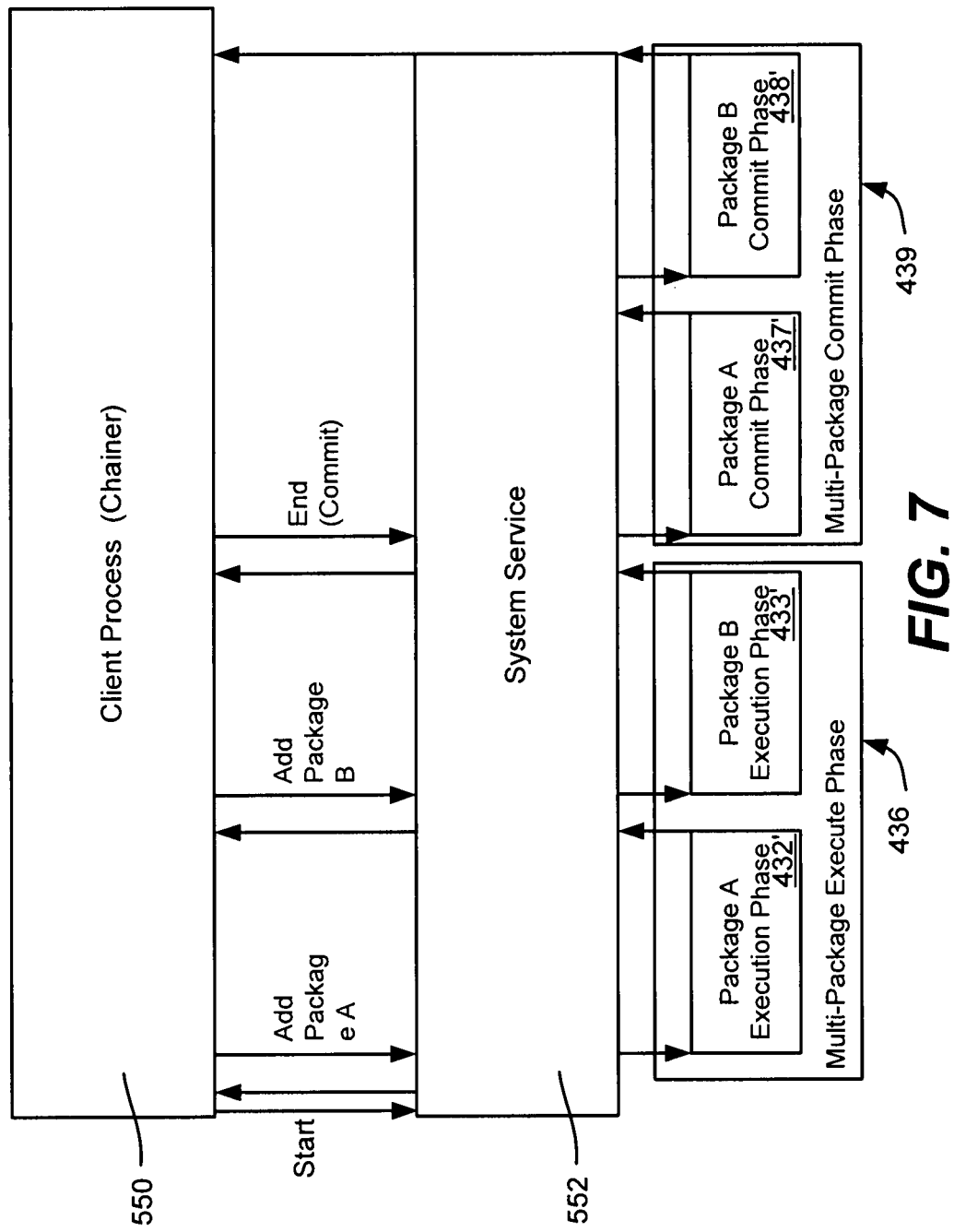
FIG. 7 is a block diagram representing a dynamic early execute, late commit interleaved multi-package installation transaction.
Figure 8:
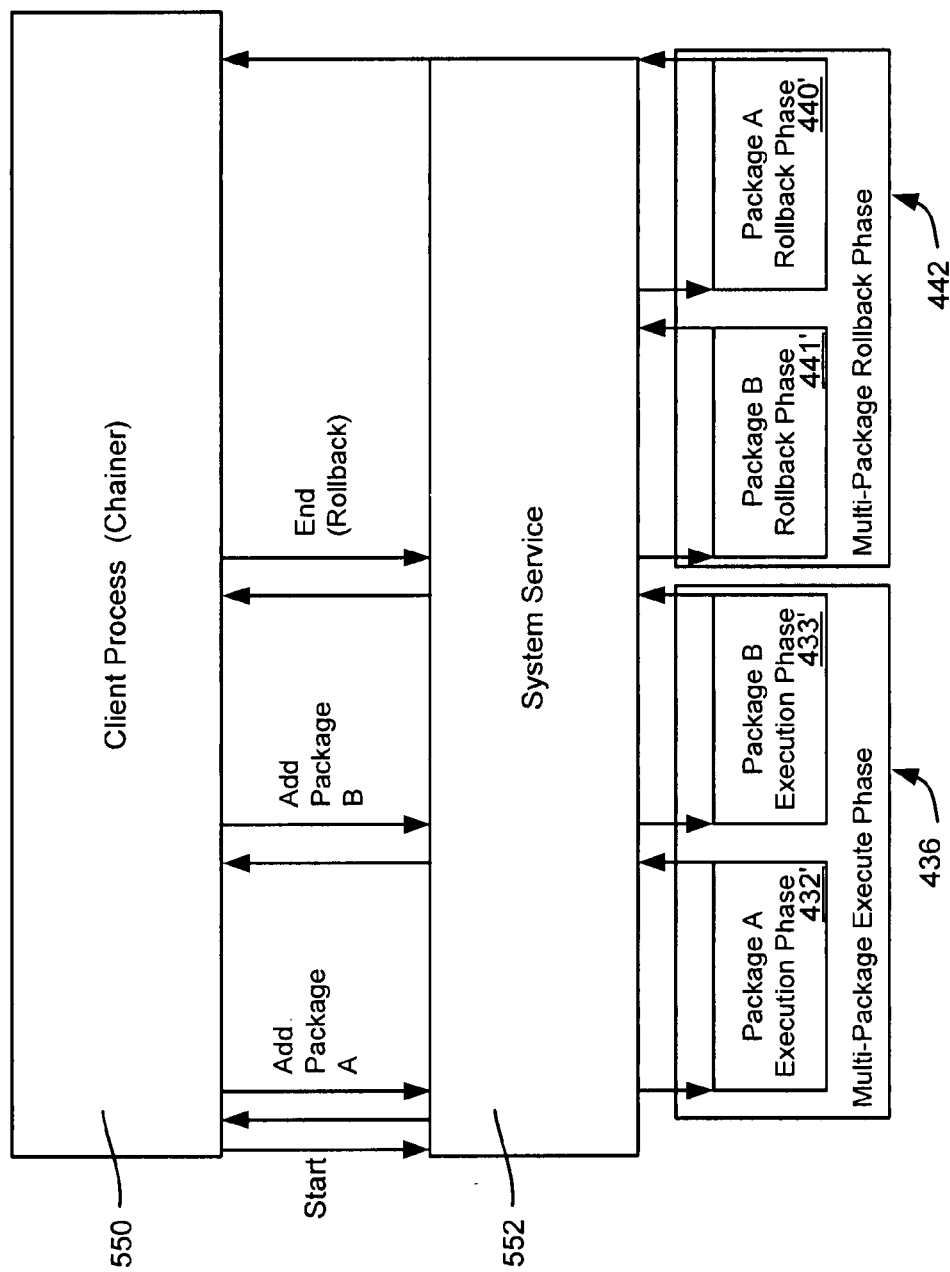
FIG. 8 is a block diagram representing a dynamic early execute, late rollback interleaved multi-package installation transaction.

FIGS. 7 and 8 are two block diagrams that represent the early execute, interleaved multi-package transaction, with late commit (FIG. 7) or late rollback (FIG. 8) sequence of behaviors.

In FIGS. 7 and 8 the client process (chainer) 550 and system service 552 generally operate as in FIG. 5 (or FIG. 6); the multi-package execute phase 436 and commit phase 439 (FIG. 7) or rollback phase 442 (FIG. 8) correspond to the interleaved example of FIG. 4. In FIGS. 7 and 8, time flows horizontally from left to right and control flows vertically from top to bottom then bottom to top; note that the arrows are generally aligned time-wise, but are not intended to provide an exact timing diagram.

As can be seen, the client process (chainer) 550 starts by calling a Start behavior of the system service 552. Once the system service has initiated a multi-package transaction, control is returned from the system service to the chainer 550. The chainer 550 then adds an installation-related action (or actions) of Package A to the multi-package transaction by calling the Add behavior from the system service 552. In turn, the system service 552 divides the single package transaction into its three constituent phases (execute, commit and rollback) and executes the Package A execution phase 432'. After the Package A execution phase 432' completes, control returns to the system service 552, which passes control back to the chainer 550.

The chainer 550 then adds the installation-related action (or actions) of package B to the multi-package transaction, whereby the system service divides the single package transaction into its three constituent phases (execute, commit and rollback) and executes the Package B execution phase 4331. After the Package B execution phase 433' completes, control returns to the system service 552, which passes control back to the chainer 550.

In this two package example, the chainer 550 may choose to terminate the multi-package transaction with a commit by calling the End behavior from the System Service as represented by the arrow accompanied by the text "End (Commit)". To commit, the system service 552 executes each of the single package commit phases (437' and 438') in first-in-first-out (FIFO) order. For example, the system service 552 may pick the first single package commit phase (block 4371) out of the FIFO queue, and calls the package A commit phase as represented by the directed arrow from the service 552 to the block 437'. After the Package A commit phase completes control returns to the system service 552 which is represented by the directed arrow back thereto. The system service 552 then picks the next single package commit phase out of the FIFO queue thus calls the Package B Commit Phase (block 438'), after which control returns to the system service 552. The system service 552 then passes control back to the client process (chainer 550) as represented by the directed arrow to the chainer 550 at the right of the system service 552.

Turning to the rollback as represented in FIG. 8, if the client process (chainer 550) instead chooses to terminate the multi-package transaction with a rollback, the chainer 550 calls the system service End behavior, labeled "End (Rollback)". The system service 552 then executes each of the single package rollback phases in last-in-first-out (LIFO) order. Thus, the package B rollback phase (block 441') is picked from the LIFO queue and rollback performed before the package A rollback phase represented by block 440'.

The rollback behavior also can be induced by a failure during the execution phase of any install; e.g., rollback may be performed if any action of an installation is not successful. For example, upon a package execution phase failure or by user cancellation, the chainer may at any time call a "rollback" finalize API to end the transaction. Failure of a chainer can also result in performing the appropriate rollback phase or phases.

Turning to an installation aspect referred to as "delegable" (or "delegation"), delegable may be generally considered as a "chainer of chainers". An example scenario is where one chainer needs to call another chainer to perform a portion of the install. To achieve this within a multi-package transaction, there is provided the capacity to delegate control (that is, the rights needed to invoke the Add and End behaviors mentioned earlier) from one chainer to another. This capacity is provided through a "Join" behavior, (although as described above, a "Delegate" behavior also provides such a capacity).

By way of example, consider the installation of different packages from different sources. In general, the chainer wraps the disparate user interfaces of the various packages. Via delegation, a first chainer may call a second chainer and pass control to that second chainer.

Figure 9A:
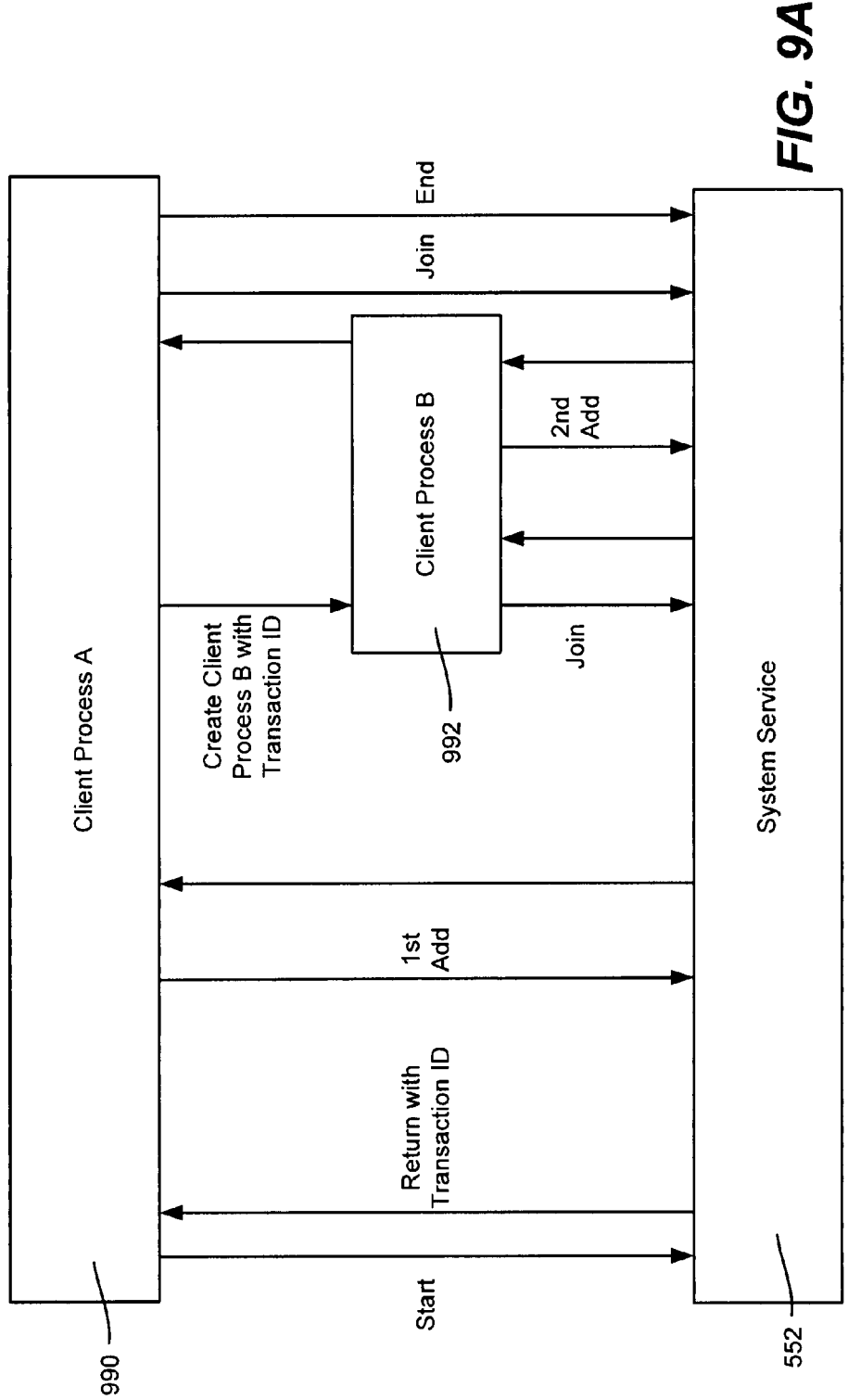
FIG. 9A is a block diagram representing a delegable dynamic interleaved multi-package transaction in which control transfers from one client process to another client process via a join function.

FIG. 9A is a block diagram that portrays an example interaction including delegation between two client processes working together to build a multi-package transaction. In FIG. 9A, the top block 990 represents the initiating client process A and the bottom block represents the system service 552 providing the behaviors. The middle row illustrates the directed lines that represent the flow of control, as well as the second client process, client process B 992.

Control starts with a Start behavior call from the client process A 990 to the system service 552. The system service 552 initiates the multi-package transaction, and control is returned to the client process A 990. This return contains a Transaction ID (identifier) for the multi-package transaction, and thus is labeled "Return with Transaction ID".

In this example, the client process A 990 decides to use the system service's Add behavior to add the installation-related action (or actions) of a first package to the single package transaction. After the system service 552 completes its initial work with the first package, control is returned to the client process A 990.

The client process A 990 now needs in this example to have the installation-related action (or actions) of a package that is controlled by the client process B 992 added to the transaction. To enable the client process B 992 to do the needed work within the transaction, the client process A 990 creates the client process B with the Transaction ID that was returned to the client process A 990 from the system service when the client process A 990 called the Start behavior. In FIG. 9A, the call to the client process B is represented by the arrow labeled "Create Client Process B with Transaction ID".

With the client process B 992 having received the Transaction ID, the client process B 992 calls the Join behavior with the Transaction ID, as represented by the arrow labeled "Join" from the client process B 992 to the system service 552. The system service 552 validates that the client process B 992 is authorized, and returns control to client process B 992.

When validated, the client process B 992 is able to operate in the multi-package transaction context, whereby the client process B 992 adds its package action or actions (the second in this example of the multi-package transaction) via the Add behavior of the system service 552, labeled "2nd Add". After the system service 552 completes its work with the second package, control is returned to client process B 992.

With the second package now introduced to the multi-package transaction, the work from client process B 992 has been completed in this example, and control returns to client process A 990. With both the client process A package and the client process B package introduced to the multi-package transaction, client process A 990 ends the transaction, as represented in FIG. 9A via the arrow labeled "End"; note that this end arrow may represent an End (commit) or End (Rollback) call. Further note that in this example implementation, before calling "End," the client process A calls "Join" so as to have the access rights to call "End."

In another alternative mentioned above and represented in FIG. 9B, a "Delegate" behavior may be provided that transfers control as initiated by one process 991 (client process A) that is the current transaction owner in control; (note that this is in contrast to having the subsequent transaction owner request permission from the current transaction owner as implemented by "Join"). As represented by the dashed arrows in FIG. 9B, the "Delegate" behavior allows the client process A 991 (e.g. a parent) that is currently in control to request that the service 552 transfer control to another (e.g. a child) client process B 993. Control may then be transferred back to the client process A 991, such as in this example where the client process A 991 calls the "End" function (requesting commit or rollback).

Figure 10:
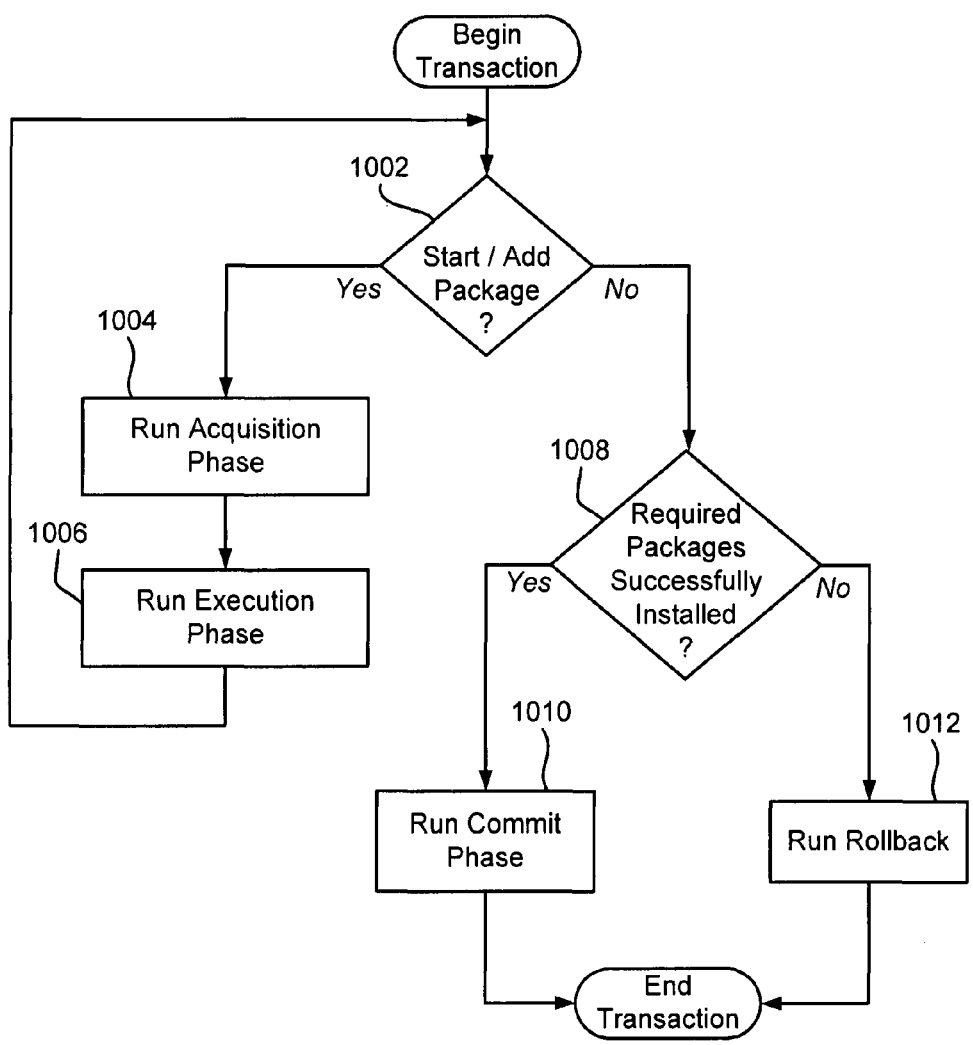
FIG. 10 is a flow diagram representing example steps taken to perform a multi-package installation transaction.

Turning to an example of the operation of a multi-package transaction installation, FIG. 10 is a flow diagram showing various steps that may be taken by a client process and/or system service. In this example, the system service includes an installer having APIs or the like called by a chainer. The chainer begins the transaction by calling a begin transaction API, and calls in to the installer to install a package as generally represented at step 1002. The installer of the system service begins the installation and runs an acquisition phase, as represented by step 1004. Note that the acquisition phase begins with the client calling into the service, such as by calling a configuration manager API to perform an install; the acquisition phase in a multi-package transaction and single package installation are the same.

The installer runs the execution phase of the package, as represented by step 1006. For example, the execution of the script may be handled by a script executor component that is created by the configuration manager, e.g., via a run script function. Note that the execution phase in a multi-package transaction and a single package transaction are the same.

However, unlike a single package installation, when the installer returns the control back to the chainer, before any commit, steps 1002, 1004 and 1006 are executed again for each of the packages that need to be installed. When no more packages have any actions to be added, step 1002 branches to step 1008.

Step 1008 represents evaluating the success of the installation of the packages. If successful, the chainer commits the transaction by calling an end transaction "commit" API. The installer then runs the commit phase for the products that are installed in the transaction (step 1010).

If the installation was not successful, step 1008 instead branches to step 1012 to perform a rollback, such as by calling a "rollback" finalize API, and ends the transaction. The installation may be unsuccessful because of a package execution phase failure, failure of a chainer, by user cancellation, or by a chainer end transaction "rollback" call. Note that step 1008 (or step 1012) may be directly executed (that is, the looping of steps 1002, 1004 and 1006 may be exited at any appropriate point) in the event of a package execution phase failure, failure of a chainer, by user cancellation, or by a chainer end transaction "rollback" call. Further note that if the chainer fails, the system service can perform the rollback and end the transaction.

How a rollback behaves may vary based on how the rollback was initiated, e.g., because of failure during the install of a package, by user cancellation or by chainer request. As described herein, an entire multi-package transaction may be rolled back, or only a subset (e.g., one or more packages) rolled back. An author of the chainer may have to flexibility to specify the type of rollback, e.g., an author may choose to rollback the install to a set point within the transaction.

Turning to commit alternatives, note that during the commit phase there are two possible places where the system changes may be executed during a product install. In one "lazy" execution model, the install script is created when an install API is called as part of the install. The script is not run to modify the system until the chainer requests the installer to commit the transaction. Upon this request, the installer executes the spooled scripts and commits the transaction. Because in this model the script execution is delayed until the transaction is committed and not run right after a set of one or more actions (e.g., an InstallExecute/InstallExecuteAgain/InstallFinalize action), this model is referred to as "Lazy Execution."

Unlike the lazy model, an alternative "early" execution model runs the install script when the service sees InstallExecute/InstallExecuteAgain/InstallFinalize actions. Early execution provides flexibility for chainer authors to include packages that have dependencies on another package in the same transaction. Note however, that the dependency can still not be a commit-level dependency.

Note that in the lazy execution model, because the scripts are spooled and not run until late in the install process, the transaction is less susceptible to failures induced by a bad chainer, e.g., a bad chainer could crash after installing less than all packages and still not affect the system. In case of early execution, the system is updated during the process, whereby if a client chainer fails without committing the transaction, the system is in an undesirable state, (although the installer can detect crashed clients and take the machine to a known state, and/or rollback the install when another client initiates an install).

With respect to committing a transaction, a lazy commit model or package-level commit model may be employed (although an early commit model is also feasible). Lazy commit is described above, e.g., when a package install is run as part of a multi-package transaction, the commit actions for all the packages are queued until the end of the transaction, when they are committed in a FIFO order. Package level commit commits a package during a multi-package transaction, and thus does not allow for complete rollback. However, package level commit provides an option for installation in which one package's installation is dependent on another package's complete installation, including committing of that other package.

Exemplary Operating Environment

Figure 11:
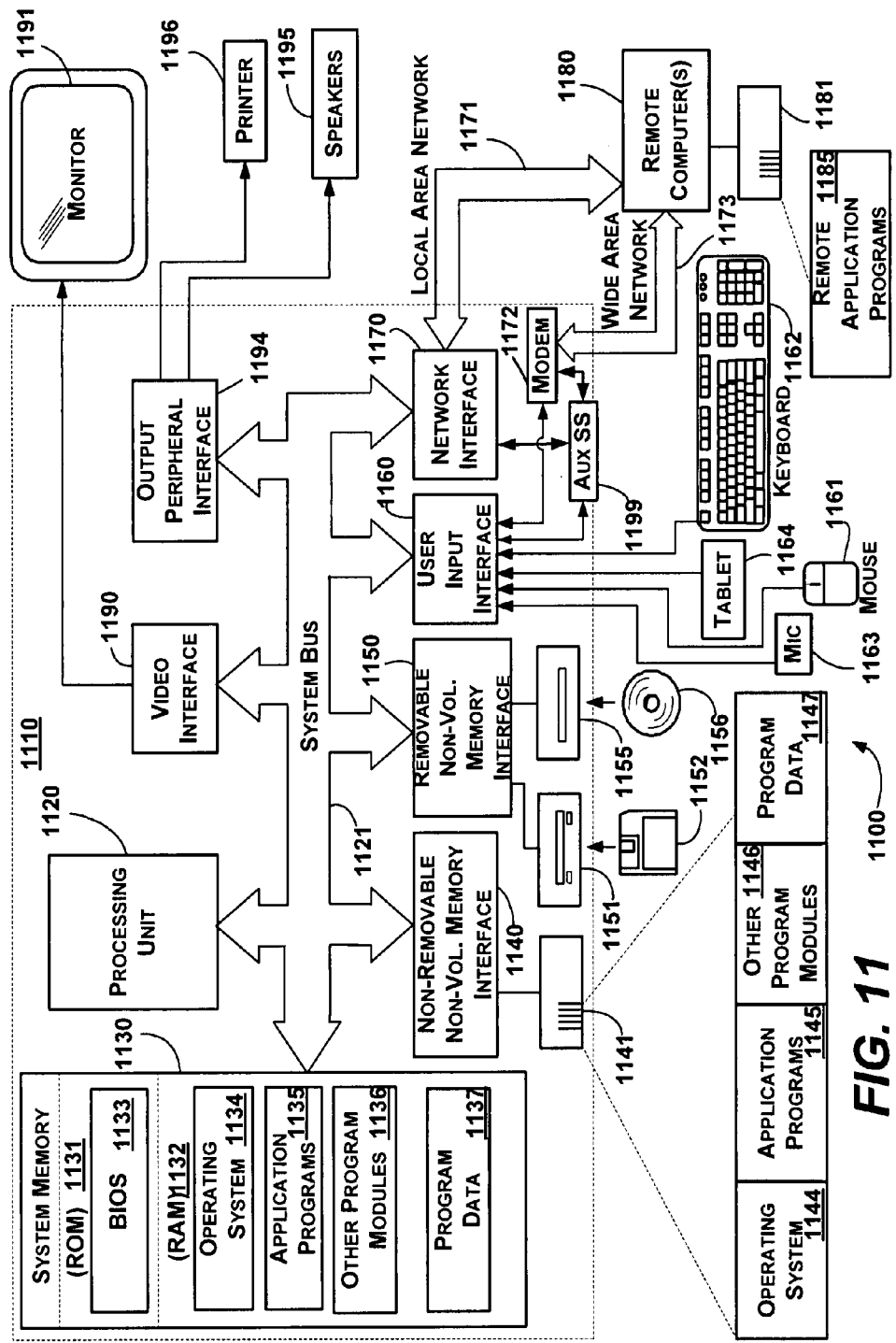
FIG. 11 is an illustrative example of a general-purpose computing environment into which various aspects of the present invention may be incorporated.

FIG. 11 illustrates an example of a suitable computing system environment 1100 on which the various aspects of FIGS. 1-10 may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment 1100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 11, an exemplary system for implementing various aspects of the invention may include a general purpose computing device in the form of a computer 1110. Components of the computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer-readable media. Computer-readable media can be any available media that can be accessed by the computer 1110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136 and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media, described above and illustrated in FIG. 11, provide storage of computer-readable instructions, data structures, program modules and other data for the computer 1110. In FIG. 11, for example, hard disk drive 1141 is illustrated as storing operating system 1144, application programs 1145, other program modules 1146 and program data 1147. Note that these components can either be the same as or different from operating system 1134, application programs 1135, other program modules 1136, and program data 1137. Operating system 1144, application programs 1145, other program modules 1146, and program data 1147 are given different numbers herein to illustrate that, at a minimum, they are different copies. A user may enter commands and information into the computer 1110 through input devices such as a tablet, or electronic digitizer, 1164, a microphone 1163, a keyboard 1162 and pointing device 1161, commonly referred to as mouse, trackball or touch pad. Other input devices not shown in FIG. 11 may include a joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. The monitor 1191 may also be integrated with a touch-screen panel or the like. Note that the monitor and/or touch screen panel can be physically coupled to a housing in which the computing device 1110 is incorporated, such as in a tablet-type personal computer. In addition, computers such as the computing device 1110 may also include other peripheral output devices such as speakers 1195 and printer 1196, which may be connected through an output peripheral interface 1194 or the like.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include one or more local area networks (LAN) 1171 and one or more wide area networks (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160 or other appropriate mechanism. A wireless networking component 1174 such as comprising an interface and antenna may be coupled through a suitable device such as an access point or peer computer to a WAN or LAN. In a networked environment, program modules depicted relative to the computer 1110, or portions thereof, may be stored in the remote memory storage device. By way of example, and not limitation, FIG. 11 illustrates remote application programs 1185 as residing on memory device 1181. It may be appreciated that the network connections shown are exemplary and other means of establishing a communications link between the computers may be used.

An auxiliary subsystem 1199 (e.g., for auxiliary display of content) may be connected via the user interface 1160 to allow data such as program content, system status and event notifications to be provided to the user, even if the main portions of the computer system are in a low power state. The auxiliary subsystem 1199 may be connected to the modem 1172 and/or network interface 1170 to allow communication between these systems while the main processing unit 1120 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A tangible computer-readable storage memory storing computer-executable instructions, which in response to execution by a computer, cause the computer to perform steps comprising:
preparing for an installation of a plurality of software packages in a single multi-package transaction, including partitioning installation actions for each software package in the plurality of software packages into an execution phase, a commit phase, and a rollback phase;
controlling the installation of the plurality of software packages via a first process, the controlling including delegating control to a second process for adding one or more installation-related actions of at least one package to the single multi-package transaction for installation, and operating to have the execution phase performed for the each software package in the plurality of software packages, wherein delegating control to the second process comprises associating an identifier of the transaction with the second process; and
a) if the execution phase for the each software package in the plurality of software packages is successful, committing the single multi-package transaction by operating to have the commit phase performed for the each software package in the plurality of software packages, or
b) if the installation for any software package in the plurality of software packages is unsuccessful, rolling back the installation by operating to have the rollback phase performed for the each software package in the plurality of software packages for which the execution phase was performed in the single multi-package transaction.

2. The tangible computer-readable storage memory of claim 1 wherein the execution phases of the plurality of packages are interleaved so as to be performed in a first-in, first-out order, and the commit phases of the plurality of packages are interleaved so as to be performed in a first-in, first-out order.

3. The tangible computer-readable storage memory of claim 1 wherein the rollback phases of the plurality of packages are interleaved so as to be performed in a last-in, first-out order.

4. The tangible computer-readable storage memory of claim 1 wherein if a first process terminates the single multi-package transaction, rolling back the installation by operating to have the rollback phase performed for the each package in the plurality of packages for which the execution phase was performed.

5. The tangible computer-readable storage memory of claim 1 wherein rolling back the installation comprises performing the rollback phase for the each package in the plurality of packages in a reverse order relative to the order of performing the execution phases.

6. The tangible computer-readable storage memory of claim 1 wherein to the second process is embedded in a package and invoked by the first process comprises.

7. The tangible computer-readable storage memory of claim 1 wherein controlling the installation includes dynamically determining at least some of which packages are to comprise the plurality of packages to install.

8. The tangible computer-readable storage memory of claim 1 wherein controlling the installation includes running a first process and running a second process embedded in the first process.

9. In a computing environment, a system comprising:
a processor;
a system service implemented on the processor and having an interface set, the system service configured to install software packages on a computing device; and
a client process coupled to the system service via the interface set, the client process configured to control installation of a plurality of software packages in a single multi-package transaction that can be simultaneously committed to complete installation or rolled back to restore the computing device to a state prior to installation, including controlling the installation by providing the plurality of software packages to the system service as a single multi-package product and delegating control to a second client process configured to add one or more installation actions to the single multi-package transaction, wherein delegating control to the second client process comprises associating an identifier of the transaction with the second process, the system service partitioning installation actions for each software package in the plurality of software packages into an execution phase, commit phase and rollback phase, wherein the installation actions for the each software package in the execution phase are interleaved so as to be performed in a first-in, first-out order, and running the execution phase for the each software package in the single multi-package product, the client process communicating with the system service to perform the commit phase to commit the single multi-package transaction and complete the installation, or to perform one or more of the rollback phases to roll back the computing device to the state prior to installation.

10. The system of claim 9 wherein the system service is further configured to queue the installation actions for the each software package in the rollback phase in a last-in, first-out order.

11. The system of claim 9 wherein the second client process wraps one or more scripts into the single multi-package transaction to specify dependencies on other packages.

12. The system of claim 9:
wherein the second client process is embedded in a package and invoked by the client process.

13. The system of claim 9 wherein the client process is further configured to dynamically determine which of the plurality of software packages are to comprise the single multi-package product to install.

14. In a computing environment, a computer implement method comprising:
preparing for an installation of a plurality of software packages in a single multi-package transaction, including partitioning installation actions for each software package in the plurality of software packages into an execution phase, a commit phase, and a rollback phase;
controlling the installation of the plurality of software packages via a first process, the controlling including delegating control to a second process for adding one or more installation-related actions of at least one package to the single multi-package transaction for installation, and operating to have the execution phase performed for the each software package in the plurality of software packages, wherein delegating control to the second process comprises associating an identifier of the transaction with the second process; and a) if the execution phase for the each software package in the plurality of software packages is successful, committing the single multi-package transaction by operating to have the commit phase performed for the each software package in the plurality of software packages, or b) if the installation for any software package in the plurality of software packages is unsuccessful, rolling back the installation by operating to have the rollback phase performed for the each software package in the plurality of software packages for which the execution phase was performed in the single multi-package transaction.

15. The method of claim 14 wherein processing the plurality of software packages further comprises:
interleaving the package installation actions in the execution phase in a first-in first-out order.

16. The method of claim 14 wherein processing the plurality of software packages further comprises:
interleaving the package installation actions in the rollback phase corresponding to a last-in first-out order.

17. The method of claim 14 wherein installing the plurality of software packages includes returning control to the first client process after completion of the commit phase.

18. The method of claim 14 wherein installing the plurality of software packages includes receiving a call from a first client process and returning information to the first client process, receiving a call from a second client process, validating the second client process based on the information returned to the first client process, and receiving calls from the first client process and the second client process to add installation related-actions of software packages to the single multi-package transaction.

19. The method of claim 14 wherein committing the single multi-package transaction comprises receiving a call from a client process, wherein the client process evaluates the success of the execution phase for the each package in the plurality of software packages, and wherein the call from the client process is an end transaction commit specification when the execution for the each package in the plurality of software packages is successful.

* * * * *